United States Patent [19]

Kipping

[11] 4,227,784
[45] Oct. 14, 1980

[54] APPARATUS FOR PRE-EXPOSURE OF PHOTOGRAPHIC FILM

[76] Inventor: Vernon L. Kipping, 540 Melrose Ave., San Francisco, Calif. 94127

[21] Appl. No.: 955,015

[22] Filed: Oct. 26, 1978

[51] Int. Cl.³ ............................................. G03B 41/00
[52] U.S. Cl. ................................. 352/244; 352/46; 352/72; 352/85; 354/354
[58] Field of Search ........................... 354/75–78, 354/126, 202, 295, 354; 352/44–46, 85, 244, 72; 96/45.2; 355/68, 71, 67

[56] References Cited

U.S. PATENT DOCUMENTS

| | | | |
|---|---|---|---|
| 2,322,144 | 6/1943 | Kirschbaum | 354/75 X |
| 2,609,294 | 9/1952 | Prentice | 352/46 X |
| 4,021,831 | 5/1977 | Bercher | 354/126 X |

*Primary Examiner*—John Gonzales
*Attorney, Agent, or Firm*—Julian Caplan

[57] ABSTRACT

A light source, preferably within the camera, exposes film prior to exposure to the scene. The image is enhanced over normal exposure, particularly in photographing shadows and low light levels. Pre-exposure overcomes the reluctance of film chemicals to activation.

4 Claims, 11 Drawing Figures

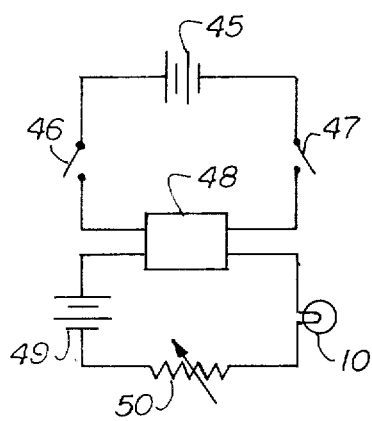
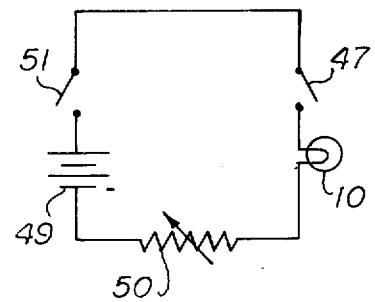
Fig.7  Fig.8
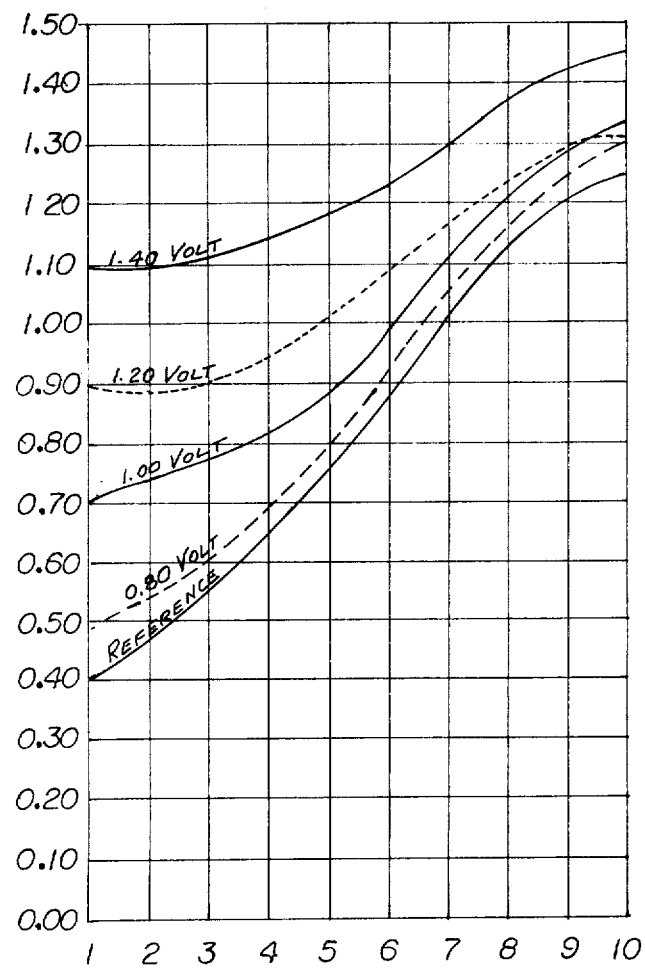
Fig.9

APPARATUS FOR PRE-EXPOSURE OF PHOTOGRAPHIC FILM

Reference is made to Disclosure Document 063469, filed Aug. 25, 1977.

This invention relates to a new and useful improvement in cameras, especially motion picture cameras. More particularly, the invention relates to a method and apparatus for the pre-exposure of photographic film to an in-camera light source so as to overcome the initial inertia of photographic film to an adequate response to light falling upon it. After initial inertia is surmounted, the photographic film is better able to record light over an extended range of light intensity levels from the scene.

The present invention provides means for exposing film to an in-camera light source immediately prior to the exposure of film to the scene which is to be recorded.

Photographic film requires a given amount of light to overcome its initial inertia. Highlight areas have an abundance of light to record adequately on the film. Unfortunately, shadows or other low light level areas seldom have light of sufficient intensity to overcome the initial inertia of exposure threshold and also record an adequate image. One of the purposes of the present invention is to provide the light necessary to surmount the film's initial inertia, thereby stimulating the film's inherent sensitivity, enabling it to record low light level areas in scenes, such as shadows, to which it was previously insensitive.

In addition to the enhancement of photographic quality through an increased capacity to record low light level areas in scenes, the system provides means for the control of tonal range within a scene. Because this control may be exercised during filming, it provides film makers with a new creative tool. For example, contracting or expanding the tonal range of a scene can be employed as a means for altering the mood, or atmosphere, in a subtle and effective manner.

Pre-exposure of film, or pre-flashing as it is also known, has been used by still and motion picture photographers for a number of years. The technique is practiced by taking an out-of-focus, under-exposed, picture of a neutral gray card. For best results, the film is immediately used to record the scene because the energization of film fades quickly. Thus, films exposed at different times after "pre-flashing" will vary as to results. Inconsistency of this nature presents a very real hazard to the film maker.

When film is exposed to a scene immediately after "pre-flashing" or pre-exposure to light, the film is in a near-optimal state of excitation for the purpose of recording a photographic image of a scene with an extended range of light levels. This is due to the fact that the silver halide crystals in the film emulsion have been stimulated to the point where the exposure threshold of the film has been overcome and additional increments of light from the scene may be recorded on the film as a useable image.

In the practice of the present invention, the film is exposed to the scene approximately one second after pre-exposure. This assures the film is in a near optimal state of excited sensitivity, whereby the film is enabled to record an image of enhanced quality.

Other methods of flashing film are achieved by the addition of light during exposure of film to the scene. This method is employed by Cole, U.S. Pat. No. 3,823,413, issued July 9, 1974, and U.S. Pat. No. 3,843,255, issued Oct. 22, 1974.

Another system of pre-flashing was invented by Turpin, as described in *American Cinematographer* in the January, 1973 issue, and by Langford, *Industrial Photography*, April, 1975, page 6. This system reflects light from an outside light source into the camera lens during exposure by reflection off of a plate glass situated at a 45° angle to the lens.

These methods are readily distinguishable from the present system because they add additional light to the film *during* exposure of the film to the scene. The effect is to dilute the light from the scene falling upon the film so that the over-all contrast of light values in the scene is reduced. In contrast, the present system adds additional light to the film *prior* to the scene exposure, so that the film is in an excited and heightened state of receptivity to light when it reaches the film gate for image exposure. The film is thus prepared to record the full range of tonal values represented by light from the scene.

The present method is superior to prior methods because the momentum of excitation established by the pre-exposure of the film is continued and accelerated by scene exposure. This process is concurrent in prior methods and fails to take full advantage of the momentum of sensitivity created in the film emulsion once it is established. In the present invention, this is the key operative element. That is, by overcoming the exposure threshold of initial inertia immediately prior to scene exposure, the film is endowed with an increased capacity to record an extended range of light values. The effect is to increase the film's sensitivity to light and enhance its image recording ability.

Because of the film's increased ability to record low light levels, the effect is to increase the "exposure index", or film sensitivity, to a marked degree. An increase of at least 200% in low light level sensitivity is possible without material loss of highlight detail. More precise information may be obtained by referring to FIG. 9 and the discussion pertaining thereto.

In the practice of the present invention, a light source is situated in a light baffled lamp house. To provide a maximum period of exposure of film to the pre-exposure light, the lamp housing is preferably cylindrical in form. A film channel around the periphery of the lamp housing provides means for exposure of the film. A window of variable width in the lamp housing provides means for controlling duration of exposure.

The light source is provided with a variable resistor to control light intensity of the pre-exposure lamp. A diffuser disposed around the light source provides means for the equal distribution of light over the film as it moves past the window of the lamp housing. Various filters may be inserted in the space between light diffuser and lamp housing to control the color temperature, intensity, and quality of the light source.

The width of the exposure window in the lamp housing may be controlled by masks of varying width inserted in the lamp housing. A preferred embodiment of the invention consists of two cylinders, co-axially disposed, each provided with appropriate windows, and provided with means for one cylinder to be rotated with relation to the other thereby controlling the width of the exposure window. The control knob, with calibrations, may be mounted on the exterior of camera housing so that the width of the exposure window may be easily varied.

The lamp house of the present invention may be situated within the body of the motion picture camera or the film magazine depending upon the requirements and design of each particular camera system.

In one preferred embodiment, a housing external to the camera body or film magazine is provided. This contains a power supply to operate the light source of the pre-exposure system, a variable resistor to control the light intensity of the lamp, a selector switch to permit the pre-exposure system to be turned off or on, and an electrical relay for turning the pre-exposure system off and on in relation to the camera operation and to provide it with an independent power system so as to isolate the electrical system of the light source from that of the camera drive system so as to avoid unwanted electrical interference.

Other objects of the present invention will become apparent upon reading the following specification and referring to the accompanying drawings in which similar characters of reference represent corresponding parts in each of the several views.

In the drawings:

FIG. 7 is a schematic drawing of the electrical circuit employed by the film pre-exposure system for cameras with electrical power.

FIG. 8 is a schematic diagram of the electrical circuit employed in cameras having a mechanical power drive.

FIG. 9 is a graph showing the densitometric curves of film pre-exposed to light in the practice of this invention together with a base reference curve of film normally exposed.

Figure 1:
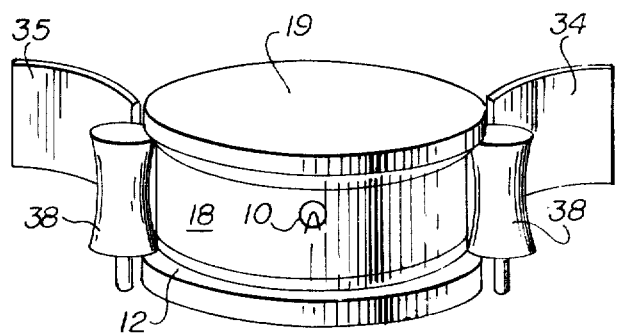
FIG. 1 is a perspective view of the lamphouse of a preferred embodiment of the invention.
Figure 2:
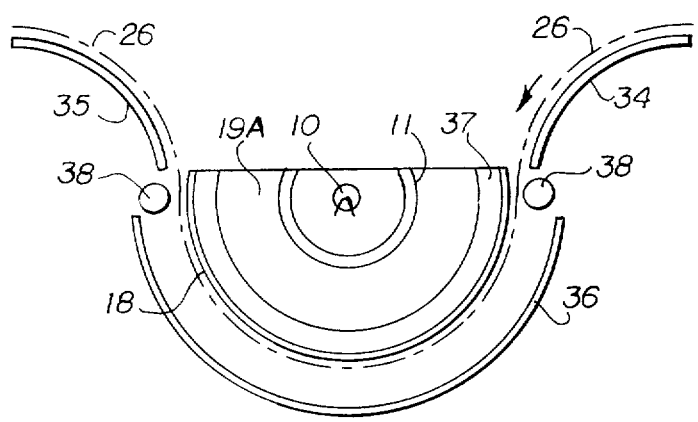
FIG. 2 is a plan view of a variant of the lamphouse, truncated for fitting into limited space inside camera housing.

FIG. 1 shows the lamphouse 19 of the pre-exposure unit. Film (not shown) is fed onto lamphouse 19 by means of guide channel 34. Film keeper roller 38 acts to insure uniform contact of film in channel 12 of lamphouse 19. This assures that film will be uniformly positioned in shutter aperture 18 for exposure to the light of lamp 10. After pre-exposure to light of lamp 10, the film moves past keeper roller 38 and film guide 35. After this, the film is exposed to the scene as will be shown and described hereafter. The cylindrical housing 19 is the preferred embodiment of the invention because it provides longest exposure time in a compact form. FIG. 2 shows a variation of the preferred embodiment modified by truncating the rear segment of lamphouse 19. This is necessary to install the pre-exposure unit into existing camera designs where space will not permit the preferred embodiment to be installed. FIG. 2 shows the manner in which diffusor 11 is disposed around lamp 10. Filter slot 37 provides support means for the placement of filters, to control the intensity, quality and color temperature of the light lamp 10, and also aperture masks, to control width of exposure window 18 by which duration of exposure of film to light of lamp 10 is controlled.

In FIG. 2, film is channeled by film guide 34 into channel 12 and window 18. Keeper rollers 38 assure uniform contact of film on lamp housing 19-A during exposure of film to light of lamp 10. After pre-exposure, film moves off lamphouse 19-A onto film guide 26 after which it is exposed to the scene in the regular manner.

Figure 3:
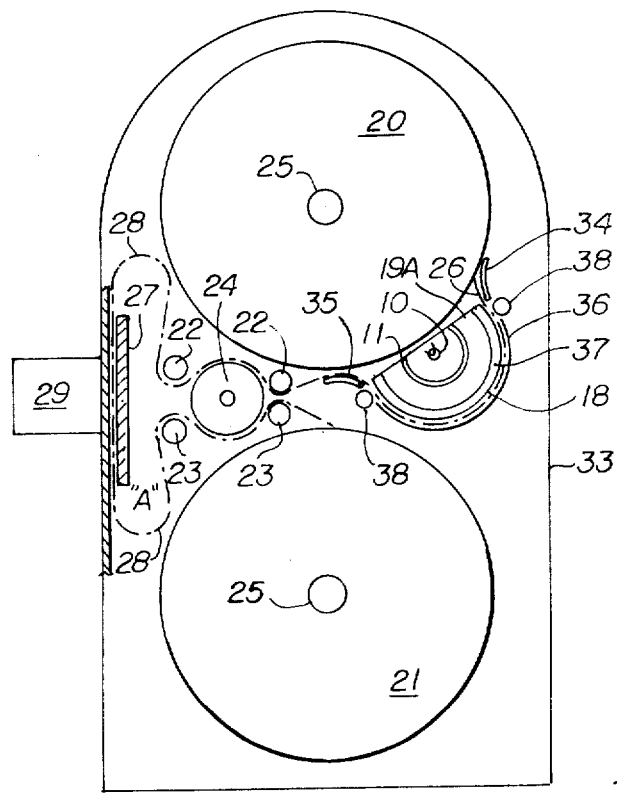
FIG. 3 is a side elevational view of the truncated cylinder variant of the lamphouse fitted into a motion picture camera.

FIG. 3 is a side elevational view of a motion picture camera 33. Raw film supply spool 20 on spindle 25 stores and supplies film. Film, channeled by film guide 34, moves onto lamphouse 19-A. Keeper rollers 38 assure uniform contact of film with periphery of lamphouse 19-A in the channel. Light from lamp 10, diffused by diffuser 11 and filtered by filters in filter slot 37, fall upon film through aperture 18. Aperture masks inserted into filter slot 37 provide control over the width of aperture window 18 thereby controlling the duration of exposure of film to light from lamp 10. The width of the aperture 18 may be described as degrees of arc in relation to the circular configuration of the lamphouse. After film is pre-exposed to light from lamp 10, it moves over film guide 35 onto film feed sprocket gear 24 where resilient contact is maintained by keeper rollers 22. Film then moves into the usual free loop 28 into pressure plate assembly 27 where image is recorded by lens 29. Then film against enters free loop 28 and moves onto film sprocket gear 24 under keeper rollers 23 and onto takeup reel 21 which rotates about spindle 25.

It is noted that the letter "A" as indicated adjacent to keeper rollers 23. Position "A" indicates an alternate position and operation of lamphouse 19-A. Location in this position will operate as a post-flashing operation rather than a pre-exposure or pre-flashing operation. Post-flashing is not the preferred method or embodiment of the invention but will serve to provide a measure of control over the tonal contrast of recorded images.

FIG. 9 is a graph showing the densitometric curves of film exposed in the practice of the present invention. A standard Eastman Kodak Company fourteen inch gray scale was recorded. Exposure is based on gray card reading, 18% reflecture. The film was Plus-X negative, 7231. Normal development with MicroPhen for 5 minutes at 68° F. was used. The numerals 1–10 at the bottom of the chart indicate the gray scale steps from black, which is Step 1, through the varying steps of gray, 2, 3, 4, etc., to white, in Step 10.

The reference curve in the chart indicates a standard exposure of film without pre-exposure. As shown in the chart, this curve begins at 0.40 and progresses up to a maximum density of 1.25. When 0.80 volts of electrical power is applied to lamp 10 at a distance of ⅜" from the film surface, the effect of pre-exposure can be seen. Lowest density increases in Step 1 from 0.40 to 0.48. The density curve parallels the reference curve, except that there is slightly more gain in the "toe" or lower end, and thereafter, the curve maintains a nearly parallel track to the reference curve, ending in Step 10 with a density of 1.31. With 1.00 volt, density increases substantially in Steps 1–4. At Step 5, density is at 0.80 and 1.00 density in Step 6, and thereafter, nearly parallels the previous curves achieving a density of 1.34 in Step 10. With 1.20 volts, density in Step 1 has increased to 0.90 and closely parallels density of the 1.00 volt curve until Steps 6 and 7. In Step 9, density is 1.30 but plateaus to 1.32 in Step 10. With 1.40 volts applied to the pre-exposure lamp, density in Step 1 has increased to 1.10, but densities are nearly equal through Steps 1, 2 and 3. In Step 4, density has increased to 1.13 and 1.17 in Step 5. Thereafter, density increases in a nearly straight line curve fashion to Step 10 where the density is 1.45. It is noted that the density is increased over a spread of 0.40 to 1.10 in Step 1; while in Step 10, the range is increased only from 1.25 to 1.45. Thus, the spread in density changes show that pre-flashing or pre-exposure substantially increases density in dark or low light level regions, Step 1, in relation to increases in highlight areas shown in Step 10. The density range in Step 1, e.g., 0.40 to 1.10, has an increase of 0.70; while in Step 10, the increase is from 1.25 to 1.45 an increase of only 0.20 in density.

Figures 5, 5A:
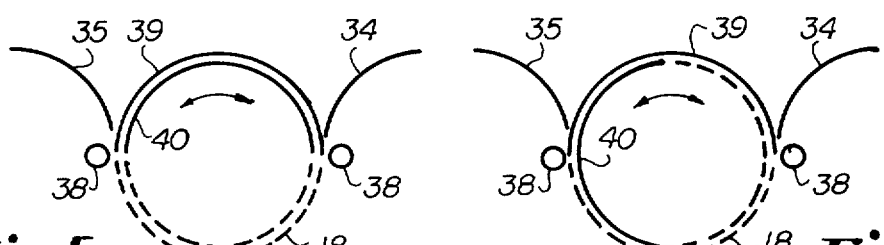
FIG. 5 is a plan view of the preferred cylindrical form of the invention. This shows the inner co-axial cylinder shutter positioned to provide a full 180° aperture width.
FIG. 5A is a view similar to FIG. 5 showing the shutter positioned to provide an aperture of approximately 90°.

FIG. 5 shows the lamphouse 39 in plan view of the preferred full circular configuration. FIG. 5 shows co-axial disposition of inner cylinder shutter 40 in position to provide a 180° shutter aperture. In FIG. 5-A, inner cylinder 40 has rotated to close shutter aperture 18 to a 90° opening.

Figures 6, 6A:
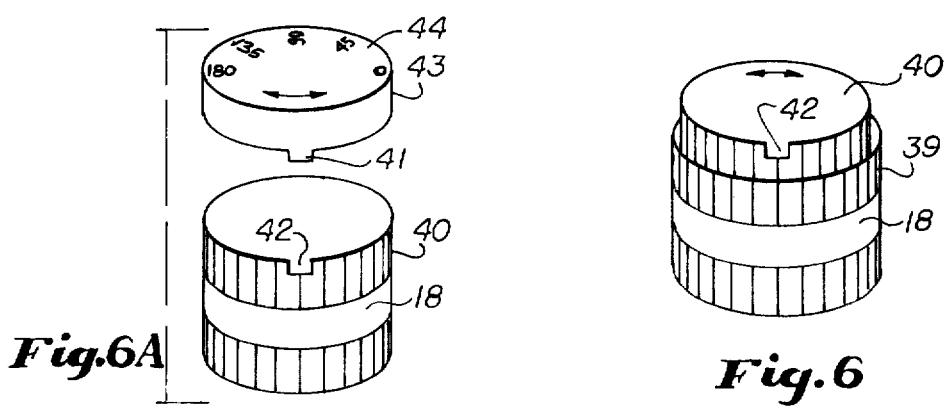
FIG. 6 is a perspective view of the inner cylinder shutter situated within the outer cylinder housing.
FIG. 6A is a perspective view of the inner cylinder shutter.

FIG. 6 shows inner cylinder co-axially disposed in lamp housing 39, while FIG. 6A shows more details of cylinder 40 with adjustment engaging detent 41. FIG. 6-B shows control knob 43 and calibrations 44. Extension 41 on knob 43 provides engagement means with detent 42 in inner cylinder 40 so as to rotate same within housing 30 thereby controlling width of window 18.

FIG. 7 is a schematic diagram of the simple electrical circuit employed in camera systems having electrical power means of operation. Here camera switch 46 closes power circuit with camera battery 45. Selector switch 47 controls whether power from battery 45 will actuate relay 48 so as to operate the pre-exposure system. When switch 47 is closed, then relay 48 is activated to that power from battery 49 powers lamp 10. Variable resistor 50 provides voltage control over power from battery 44 to lamp 10 so as to control intensity of light from lamp 10.

FIG. 8 is a schematic diagram of the electrical power systems on cameras having a mechanical drive system. Here a mechanical switch 51 is closed by camera being activated. This closes the circuit and the pre-exposure lamp 10 will be powered by current from battery 49 providing pre-exposure switch 47 has been closed. Variable resistor 50 controls intensity of light from lamp 10 by controlling voltage applied to said lamp.

Figure 4:
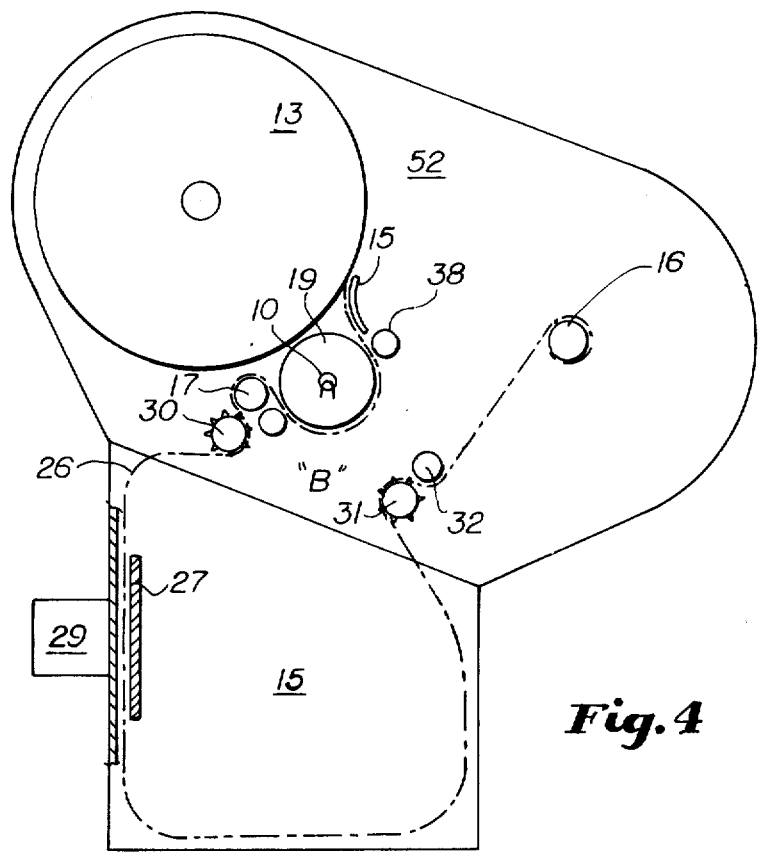
FIG. 4 is a side elevational view of the preferred cylindrical embodiment of the invention fitted into the film magazine of a motion picture camera.

FIG. 4 is a side elevational view of the pre-exposure unit installed in a film magazine. Film magazine 52 contains raw film supply roll 13. Film sprocket drive gear 30 draws film off of reel 13 onto film guide channel 38 onto lamphouse 19 with which it is held in uniform engagement by film keepers 38. After being exposed to light source lamp 10 in housing 19, film is moved over roller 17 which keeps film in motive engagement with sprocket gear 30. Film having been pre-exposed to light 10 then moves into pressure plate assembly 27 for exposure to scene by lens 29. Thereafter, film moves over film take-up sprocket gear 31 and under keeper roller 32 and thence onto film take-up spool 16.

In Table 1, there is shown data concerning the shutter widths both in degrees and inches together with the resulting shutter speed. This table is based on a lamphouse diameter of 1.25" for 16 MM motion picture film at the standard speed of 24 frames per second.

Table 2 is a table of shutter widths shown in degrees as related to exposure indeces. This represents an extension of information contained in Table 1.

Table 3 shows the brightness levels resulting from the indicated voltages being applied to a 3 volt, 200 milliampere, sub-miniature lamp, at a distance of ⅜" through a filter pack consisting of a ¼" white plastic diffuser, a 78-A and a CC-20 cyan filter. The light output was measured at the film plane of the lamphouse with a Gossen Luna Pro light meter in reflected light mode. This table is also an extension of Table 1.

Table 4 provides data for a 35 MM motion picture camera at a 24 frames per second frame rate. Shutter width is shown both in inches and in degrees with resulting exposure periods shown in fractional seconds as based on a 3" diameter lamphouse.

TABLE 1

| Shutter Width (Degrees) | Shutter Width (Inches) | Shutter Speed (Seconds) |
| --- | --- | --- |
| 180 | 1.96 | 1/3.66 |
| 150 | 1.63 | 1/4.40 |
| 120 | 1.30 | 1/5.50 |
| 90 | 0.98 | 1/7.33 |
| 60 | 0.65 | 1/11 |
| 45 | 0.490 | 1/14.66 |
| 30 | 0.32 | 1/22 |
| 22.5 | 0.245 | 1/29.33 |
| 15 | 0.16 | 1/44 |
| 11.5 | 0.122 | 1/58.66 |
| 7.5 | 0.081 | 1/88 |

Table 1 - Table of shutter widths shown in degrees and inches and resulting exposure periods in seconds. Based on 1.25 inch diameter lamphouse, for 16 MM film at, 24 FPS.

TABLE 2

| Shutter (Degrees) | Exposure Index Film (A.S.A.) |
| --- | --- |
| 180 | 32 |
| 90 | 64 |
| 45 | 125 |
| 22.5 | 250 |
| 11.25 | 500 |
| 5.625 | 1000 |
| 2.81 | 2000 |

TABLE 2 - A table of shutter widths shown in degrees as related to exposure indexes of films.

TABLE 3

| Applied Voltage (To Lamp at Controls) | Light Intensity (Approx.) (In Foot Candles) |
| --- | --- |
| 0.70 V. | 0.065 F.C. |
| 0.75 V. | 0.10 F.C. |
| 0.80 V. | 0.20 F.C. |
| 0.90 V. | 0.45 F.C. |
| 0.95 V. | 0.50 F.C. |
| 1.00 V. | 0.68 F.C. |
| 1.10 V. | 0.70 F.C. |
| 1.20 V. | 1.60 F.C. |
| 1.40 V. | 2.20 F.C. |

TABLE 3 - Table showing brightness levels resulting from voltage applied to 3 Volt, 200 M.A., lamp, at distance of ⅜". Filter Pack: Diffuser, 78-A and CC-20C filters. Light output measured with Gossen Luna Pro light meter, reflected light mode. Based on lamphouse diameter of 1.25" for 16 MM.

TABLE 4

| Shutter Width (Degrees) | Shutter Width (Inches) | Shutter Speed (Seconds) |
| --- | --- | --- |
| 180 | 4.71 | 1/3.81 |
| 120 | 3.14 | 1/5.72 |
| 90 | 2.35 | 1/7.63 |
| 60 | 1.57 | 1/11.45 |
| 45 | 1.17 | 1/15.27 |
| 30 | 0.78 | 1/22.91 |
| 22.5 | 0.58 | 1/30.55 |
| 15 | 0.39 | 1/45.83 |
| 11.25 | 0.29 | 1/61.11 |
| 7.5 | 0.19 | 1/91.67 |

TABLE 4 - Table for 35 MM motion picture cameras, at 24 FPS frame rate, showing shutter width in degrees, inches and exposure period in seconds. Based on 3" diameter lamphouse.

What is claimed is:

1. A motion picture portable camera for flashing raw film immediately prior to exposure of said film to increase shadow detail, conserve illumination power and lower the initial inertia of exposure threshold of said film comprising a camera housing, an exposure aperture in said camera housing, a raw film magazine on one side of said exposure aperture for containing raw film having at least one image area, a take-up magazine on the side of said exposure aperture opposite said raw film magazine a flashing housing having a flashing aperture located between said raw film magazine and said exposure aperture dimensioned to expose substantially an entire image area of film, a lamp in said flashing housing, guide means for guiding film from said raw film magazine past said flashing aperture for exposure of said film independent of any exposure from a scene to be photographed, and film drive means for transporting film from said raw film magazine past said exposure aperture and into said take-up magazine and also at a uniform rate of linear movement past said flashing housing prior to passage past said exposure aperture, said camera housing, said raw film magazine and said flash housing comprising a single, extraneous light-free path for said raw film such that said raw film is first pre-flashed as it is continuously driven past said flashing aperture and excited and then exposed to the scene to be filmed as it is driven past said exposure aperture.

2. A camera according to claim 1 which further comprises a window for said flashing aperture and means for adjusting the position of said window to adjust the effective opening of said flashing aperture.

3. A camera according to claim 1 which further comprises a slot in said flashing housing shaped to receive a filter to interpose said filter between said lamp and said film.

4. A camera according to claim 1 which further comprises an electric circuit comprising said lamp and a variable resistor to vary the intensity of illumination of said lamp.

* * * * *